US011785233B2

United States Patent
Chan et al.

(10) Patent No.: US 11,785,233 B2
(45) Date of Patent: Oct. 10, 2023

(54) VIDEO INTERFACE CONVERSION DEVICE AND METHOD

(71) Applicant: REALTEK SEMICONDUCTOR CORPORATION, Hsinchu (TW)

(72) Inventors: Chun-Chieh Chan, Hsinchu (TW); Tai-Jung Wu, Hsinchu (TW); Ming-An Wu, Hsinchu (TW); Chien-Hsun Lu, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 197 days.

(21) Appl. No.: 17/120,362

(22) Filed: Dec. 14, 2020

(65) Prior Publication Data

US 2021/0185291 A1    Jun. 17, 2021

(30) Foreign Application Priority Data

Dec. 17, 2019   (TW) ................................ 108146198

(51) Int. Cl.
*H04N 19/40*    (2014.01)
*H04N 19/186*   (2014.01)
(Continued)

(52) U.S. Cl.
CPC .......... *H04N 19/40* (2014.11); *H04N 19/164* (2014.11); *H04N 19/186* (2014.11);
(Continued)

(58) Field of Classification Search
CPC ................ H04N 19/186; H04N 19/40; H04N 21/2662; H04N 21/440218; H04N 21/44029
See application file for complete search history.

(56) References Cited

U.S. PATENT DOCUMENTS 6,970,602 B1 *  11/2005  Smith ................. H04N 19/186
                                                    375/E7.137
2003/0185302 A1 * 10/2003 Abrams, Jr. ........... H04N 19/40
                                                    386/E5.072
(Continued)

FOREIGN PATENT DOCUMENTS

DE    102016209125 A1 * 12/2016 ........... G11B 27/031

OTHER PUBLICATIONS

R. Cucchiara, C. Grana, & A. Prati, "Semantic Transcoding of Videos by Using Adaptive Quantization", 5 J. Internet Tech. 341-350 (Oct. 2004) (Year: 2004).*

*Primary Examiner* — David N Werner
(74) *Attorney, Agent, or Firm* — WPAT, PC

(57) ABSTRACT

The present disclosure discloses a video interface conversion device that includes a first and a second interface transmission circuit, a color conversion circuit and an image compression circuit. The first and the second interface transmission circuit are respectively electrically coupled to an image source and a display terminal. The second interface transmission circuit negotiates a maximum output bandwidth with the display terminal such that the first interface transmission circuit compares an input data bandwidth of a data signal received from the image source and the maximum output bandwidth. When the maximum output bandwidth is smaller than the input data bandwidth, an image compression and/or a color coding conversion is performed on the data signal, and the data signal having the processed input data bandwidth being smaller than or equal to the maximum output bandwidth is further transmitted by the second interface transmission circuit to the display terminal.

16 Claims, 2 Drawing Sheets

(51) Int. Cl.
  *H04N 19/164* (2014.01)
  *H04N 21/4402* (2011.01)
  *H04N 11/02* (2006.01)
  *H04N 11/20* (2006.01)
  *H04N 7/01* (2006.01)

(52) U.S. Cl.
  CPC ........... *H04N 21/4402* (2013.01); *H04N 7/01* (2013.01); *H04N 11/02* (2013.01); *H04N 11/20* (2013.01); *H04N 21/44029* (2013.01); *H04N 21/440218* (2013.01)

(56) References Cited

U.S. PATENT DOCUMENTS

| | | | |
|---|---|---|---|
| 2004/0022389 A1* | 2/2004 | Shen-Orr | H04N 19/40 375/E7.02 |
| 2005/0129123 A1* | 6/2005 | Xu | H04N 19/187 375/E7.157 |
| 2006/0132646 A1* | 6/2006 | Komatsu | H04N 7/0125 348/E7.016 |
| 2006/0235883 A1* | 10/2006 | Krebs | H04N 21/4621 |
| 2018/0077434 A1* | 3/2018 | Sugeno | H04N 19/00 |
| 2019/0045232 A1* | 2/2019 | Sharif-Ahmadi | H04N 21/44204 |

\* cited by examiner

VIDEO INTERFACE CONVERSION DEVICE AND METHOD

BACKGROUND OF THE INVENTION

1. Field of the Invention

The present disclosure relates to a video interface conversion device and a video interface conversion method.

2. Description of Related Art

Consumer electronics products may use different display interfaces due to different market needs or may use the same display interface that supports different bandwidth or different transmission rates due to variations of technical versions or product specifications. As a result, conversions between different interfaces or different bandwidths are required. By using an interface or bandwidth conversion device, the user is able to obtain a better viewing experience throughout different types of consumer electronics products.

Even though many interface conversion products exist, difference in bandwidth limits between the input interface and the output interface can degrade the viewing experience.

SUMMARY OF THE INVENTION

In consideration of the problem of the prior art, an object of the present disclosure is to provide a video interface conversion device and a video interface conversion method.

The present disclosure discloses a video interface conversion device that includes a first interface transmission circuit, a second interface transmission circuit, a color conversion circuit and an image compression circuit. The first interface transmission circuit is electrically coupled to an image source. The second interface transmission circuit is electrically coupled to a display terminal to negotiate a maximum output bandwidth with the display terminal such that the first interface transmission circuit compares an input data bandwidth of a data signal received from the image source and the maximum output bandwidth. When the maximum output bandwidth is smaller than the input data bandwidth, the image compression circuit is configured to perform image compression on the data signal and/or the color conversion circuit is configured to perform color coding conversion on the data signal so that the processed data signal has the input data bandwidth being smaller than or equal to the maximum output bandwidth, and wherein the processed data signal is further transmitted by the second interface transmission circuit to the display terminal.

The present disclosure also discloses a video interface conversion method used in a video interface conversion device that includes the steps outlined below. By a first interface transmission circuit, an input data bandwidth of a data signal received from an image source and a maximum output bandwidth negotiated by a second interface transmission circuit with a display terminal are compared. Image compression is performed on the data signal by an image compression circuit and/or color coding conversion is performed on the data signal by a color conversion circuit when the maximum output bandwidth is smaller than the input data bandwidth so that the processed data signal has the input data bandwidth being smaller than or equal to the maximum output bandwidth. The processed data signal is transmitted by the second interface transmission circuit to the display terminal.

These and other objectives of the present disclosure will no doubt become obvious to those of ordinary skill in the art after reading the following detailed description of the preferred embodiments that are illustrated in the various figures and drawings.

DETAILED DESCRIPTION OF THE PREFERRED EMBODIMENTS

An aspect of the present invention is to provide a video interface conversion device and a video interface conversion method to coordinate an input data bandwidth and a maximum output bandwidth to accomplish the most efficient data transmission and the best display result at the same time.

Figure 1:
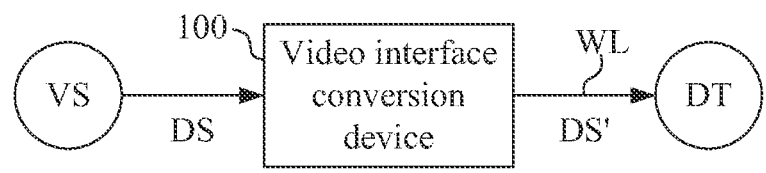
FIG. 1 illustrates a block diagram of a video interface conversion device according to an embodiment of the present invention.

Reference is now made to FIG. 1. FIG. 1 illustrates a block diagram of a video interface conversion device 100, an image source VS and a display terminal DT according to an embodiment of the present invention.

The video interface conversion device 100 is electrically coupled between the image source VS and the display terminal DT. The image source VS can be such as, but not limited to a notebook computer or a handheld electronic device. The display terminal DT can be such as, but not limited to a television. The image source VS is configured to provide a data signal DS such that the video interface conversion device 100 amends the data amount of the data signal DS and/or converts the format of the data signal DS to generate a data signal DS'. The video interface conversion device 100 further transmits the data signal DS' to the display terminal DT to be displayed.

More specifically, when the image source VS and the display terminal DT have the same video interface format but with different data input and output bandwidths, the video interface conversion device 100 is configured to coordinate the data input and output bandwidths such that the data signal DS from the image source VS is amended to generate the data signal DS' suitable to be displayed by the display terminal DT. The data signal DS' can thus be displayed by the display terminal DT.

On the other hand, when the image source VS and the display terminal DT have different video interface formats and different data input and output bandwidths, the video interface conversion device 100 not only coordinates the data input and output bandwidths, but also performs conversion of the video interfaces such that the data signal DS can be transmitted from the image source VS to the display terminal DT. In an embodiment, when the image source VS and the display terminal DT have different video interface formats, one of the image source VS and the display terminal DT may have the video interface format of such as, but not limited to DisplayPort, and the other may have the video interface format of such as, but not limited to High Definition Multimedia Interface (HDMI).

Figure 2:
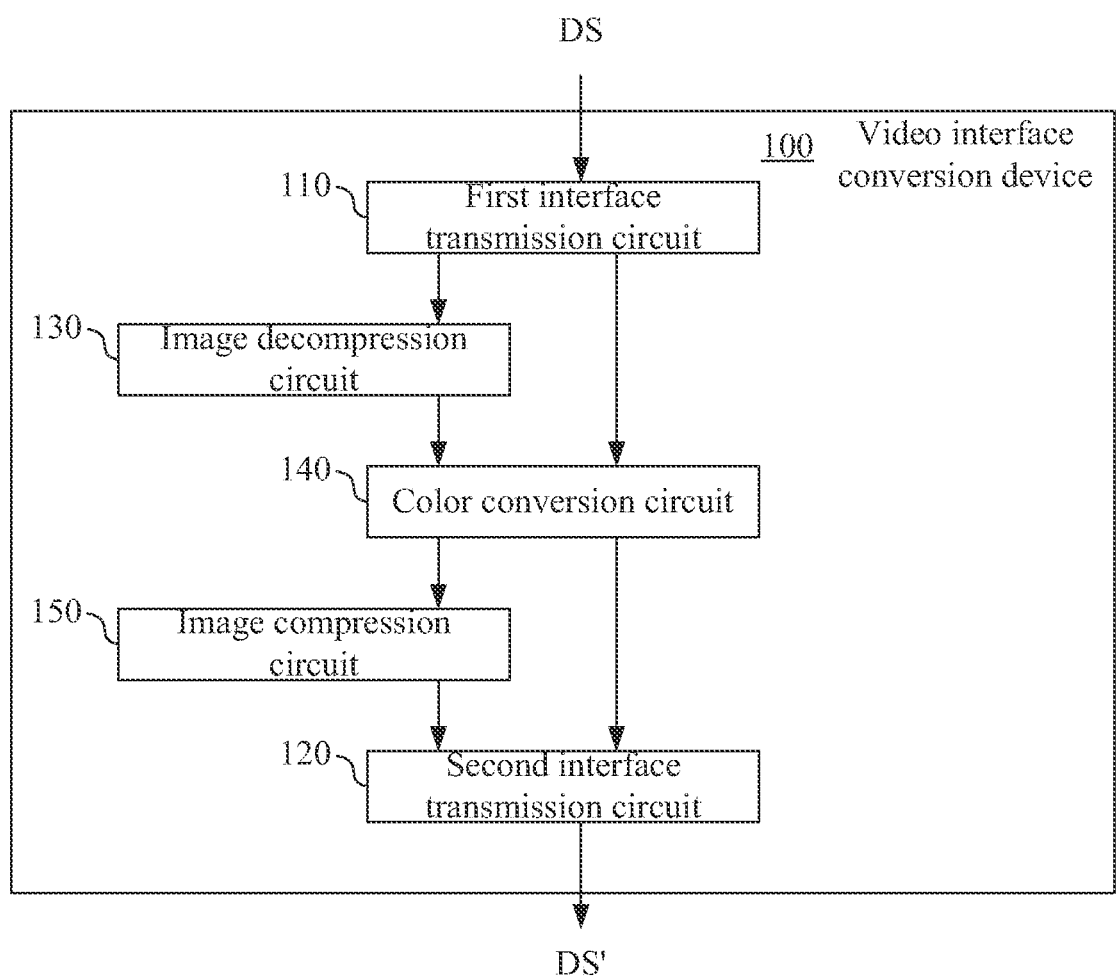
FIG. 2 illustrates a detail block diagram of the video interface conversion device according to an embodiment of the present invention.

Reference is now made to FIG. 2. FIG. 2 is a detail block diagram of the video interface conversion device 100 according to an embodiment of the present invention.

The video interface conversion device 100 includes a first interface transmission circuit 110, a second interface transmission circuit 120, an image decompression circuit 130, a color conversion circuit 140 and an image compression circuit 150.

The first interface transmission circuit 110 is electrically coupled to the image source VS. The second interface transmission circuit 120 is electrically coupled to the display terminal DT.

The image decompression circuit 130, the color conversion circuit 140 and the image compression circuit 150 are configured to perform conversion of data amount on the data signal DS received by the first interface transmission circuit 110 from the image source VS.

The image decompression circuit 130 and the image compression circuit 150 are configured to decompress and compress the data signal DS to accomplish the object of conversion of data amount.

The color conversion circuit 140 is configured to perform color coding conversion on the data signal DS that uses different color coding or abandons part of the color information to accomplish the object of conversion of data amount. In an embodiment, the data signal DS can be transmitted to the color conversion circuit 140 directly from the first interface transmission circuit 110 to perform color coding conversion and be outputted to the second interface transmission circuit 120 and further to the display terminal DT. On the other hand, the data signal DS can be transmitted from the first interface transmission circuit 110, processed by the image decompression circuit 130 and further transmitted to the color conversion circuit 140 to perform color coding conversion. Further, the converted data signal DS can be processed by the image compression circuit 150, outputted to the second interface transmission circuit 120 and further outputted as the data signal DS' to the display terminal DT.

The operation process of the video interface conversion device is described in detail in the following paragraphs.

At first, the first interface transmission circuit 110 is configured to compare an input data bandwidth of the data signal DS received from the image source VS and a maximum output bandwidth negotiated by the second interface transmission circuit 120 with the display terminal DT.

In an embodiment, the first interface transmission circuit 110 determines whether the data signal DS is a standard image format. The standard image format can be such as, but not limited to the standard format defined by Video Electronics Standards Association (VESA).

When the data signal DS is not the standard image format, the first interface transmission circuit 110 determines that the data signal DS is a compressed format and compares the input data bandwidth of the decompressed data signal DS and the maximum output bandwidth negotiated by the second interface transmission circuit 120 with the display terminal DT. The first interface transmission circuit 110 can selectively control the image decompression circuit 130 to perform decompression on the data signal DS when such as, but not limited to the condition that the maximum output bandwidth is larger than the input data bandwidth of the decompressed data signal DS.

The maximum output bandwidth negotiated by the second interface transmission circuit 120 with the display terminal DT is the maximum output bandwidth that is set according to the data transmission ability and display ability supported by the display terminal DT after the second interface transmission circuit 120 is connected to the display terminal DT.

In an embodiment, the display terminal DT may store display terminal identification information (not illustrated), such as but not limited to extended display identification data (EDID) or DisplayPort configuration data (DPCD), used to identify the data transmission ability and display ability supported by the display terminal DT. The second interface transmission circuit 120 can receive the display terminal identification information to determine the maximum output bandwidth negotiated with the display terminal DT according to the display terminal identification information and transmits the information of the maximum output bandwidth to the first interface transmission circuit 110.

In another embodiment, the second interface transmission circuit 120 and the display terminal DT are coupled through a wire WL. The second interface transmission circuit 120 determines the maximum output bandwidth negotiated with the display terminal DT according to both the display terminal identification information and the wire transmission ability of the wire WL. In practical implementation, the second interface transmission circuit 120 can transmit connection test signals having different output bandwidths and determine the wire transmission ability by determining whether the display terminal DT responses to the connection test signals. As a result, besides the output bandwidths that the display terminal DT can actually support, the second interface transmission circuit 120 can also determine the maximum output bandwidth according to the wire transmission ability to avoid the misjudgment of the maximum output bandwidth due to the low quality of the wire.

When the maximum output bandwidth is smaller than the input data bandwidth, the first interface transmission circuit 110 controls the image compression circuit 150 to perform image compression and/or the color conversion circuit 140 to perform color coding conversion on the data signal DS, so that the processed data signal DS has the input data bandwidth being smaller than or equal to the maximum output bandwidth. Further, the data signal DS after being processed is transmitted by the second interface transmission circuit 120 to the display terminal DT to be displayed on the display terminal DT.

For example, when the data signal DS is inputted with a high resolution, e.g. a resolution higher than or equal to 4K, such that the maximum output bandwidth is smaller than the input data bandwidth, the image compression circuit 150 can perform image compression on the data signal DS so that the processed data signal DS has the input data bandwidth being smaller than or equal to the maximum output bandwidth. The data signal DS' after being compressed can be transmitted by the second interface transmission circuit 120 to the display terminal DT to be displayed on the display terminal DT.

On the other hand, the color conversion circuit 140 performs color coding conversion that includes a color format conversion, a color depth coding or a combination thereof on the data signal DS. The color format of the data signal DS can be such as, but not limited to YUV444, YUV422, YUV420 or RGB format of 16-bit, 12-bit, 10-bit or 8-bit.

When the maximum output bandwidth is smaller than the input data bandwidth, the color conversion circuit 140 can convert the data signal DS from a color format having a larger data amount to a color format having a relatively smaller data amount so that the processed data signal DS has the input data bandwidth being smaller than or equal to the maximum output bandwidth. The data signal DS' after the color conversion is performed can be transmitted by the second interface transmission circuit 120 to the display terminal DT to be displayed on the display terminal DT.

It is appreciated that the image compression and the color format conversion can be performed selectively or simultaneously to accomplish different degrees of decreasing of the data amount.

In yet another embodiment, when the maximum output bandwidth is smaller than the input data bandwidth and the difference therebetween is larger than a predetermine threshold value, besides the decreasing of the data amount by using the image compression and the color format conversion, the component of sound included in the data signal DS can be selectively abandoned to further decrease the data amount so that the data signal DS' can be transmitted by the second interface transmission circuit 120 to the display terminal DT to be displayed on the display terminal DT.

In yet another embodiment, when the image compression formats mismatch under the condition that the maximum output bandwidth is equal to the input data bandwidth, a newly compressed version of the data signal DS can be generated by using the image decompression circuit 130 and the image compression circuit 150 so that the data signal DS' can be transmitted by the second interface transmission circuit 120 to the display terminal DT to be displayed on the display terminal DT.

In yet another embodiment, when the maximum output bandwidth is smaller than the input data bandwidth and the data amount can not be further decreased according to the image compression and the color format conversion performed by the color conversion circuit 140 and the image compression circuit 150 such that the display terminal DT is not able to display the data signal DS', the condition that the wire transmission ability is too low such that the difference between the maximum output bandwidth and the input data bandwidth is too large is determined.

As a result, the second interface transmission circuit 120 amends a supported output bandwidth of display terminal identification information according to the wire transmission ability and transmits the supported output bandwidth to the image source VS through the first interface transmission circuit 110 such that the image source VS amends the input data bandwidth of the data signal DS according to the supported output bandwidth and retransmits the data signal. The difference between the maximum output bandwidth and the input data bandwidth can thus be decreased so that the data signal DS can be directly transmitted by the second interface transmission circuit 120 to the display terminal DT or can be processed by using the image compression or the color format conversion in order to be displayed on the display terminal DT.

When the maximum output bandwidth is larger than the input data bandwidth, the second interface transmission circuit 120 can either directly output the data signal DS or can reconnect to the display terminal DT and negotiate an output bandwidth that is larger than or equal to the input data bandwidth and is closest to the input data bandwidth.

For example, in a usage scenario, when the first interface transmission circuit 110 determines that the data signal DS is not the standard image format and determines that the maximum output bandwidth is larger than the input data bandwidth, the first interface transmission circuit 110 can control the image decompression circuit 130 to decompress the data signal DS such that the second interface transmission circuit 120 directly outputs the decompressed data signal DS' to the display terminal DT. Under such a condition, even the input data bandwidth is smaller, the display terminal DT having a better transmission and display ability can accomplish a better display result by using the method described above.

When the first interface transmission circuit 110 determines that the data signal DS is the standard image format and determines that the maximum output bandwidth is larger than the input data bandwidth, the second interface transmission circuit 120 can directly output the data signal DS' without the processing of the image decompression circuit 130, the color conversion circuit 140 and the image compression circuit 150 such that the data signal DS' is displayed on the display terminal DT.

On the other hand, when the condition such as, but not limited to that the level of the format supported by the image source VS is too low such that the maximum output bandwidth is larger than the input data bandwidth, the second interface transmission circuit 120 can reconnect to the display terminal DT and negotiate a format having a lower bandwidth. More specifically, the second interface transmission circuit 120 can negotiate the output bandwidth with the display terminal DT that is larger than or equal to the input data bandwidth and is closest to the input data bandwidth to avoid the condition that an over-high level of transmission format is used for the transmission toward the display terminal DT when the input data bandwidth of the image source VS is smaller. A power-saving mechanism can thus be accomplished.

It is appreciated that when the image source VS and the display terminal DT have the same video interface format, the video interface conversion device 100 can simply perform coordination of the data input and output bandwidth described above. When the image source VS and the display terminal DT have different video interface formats, beside the coordination of the data input and output bandwidth, the video interface conversion device 100 further uses the second interface transmission circuit 120 to perform conversion of the video interface format such that the video interface format of the data signal DS is converted from the format corresponding to the image source VS to the format corresponding to the display terminal DT.

As a result, the video interface conversion device 100 can perform coordination when the input data bandwidth of the data signal DS received from the image source VS by the first interface transmission circuit 110 is different from the maximum output bandwidth negotiated by the second interface transmission circuit 120 with the display terminal DT to accomplish the most efficient data transmission and the best display result.

Figure 3:
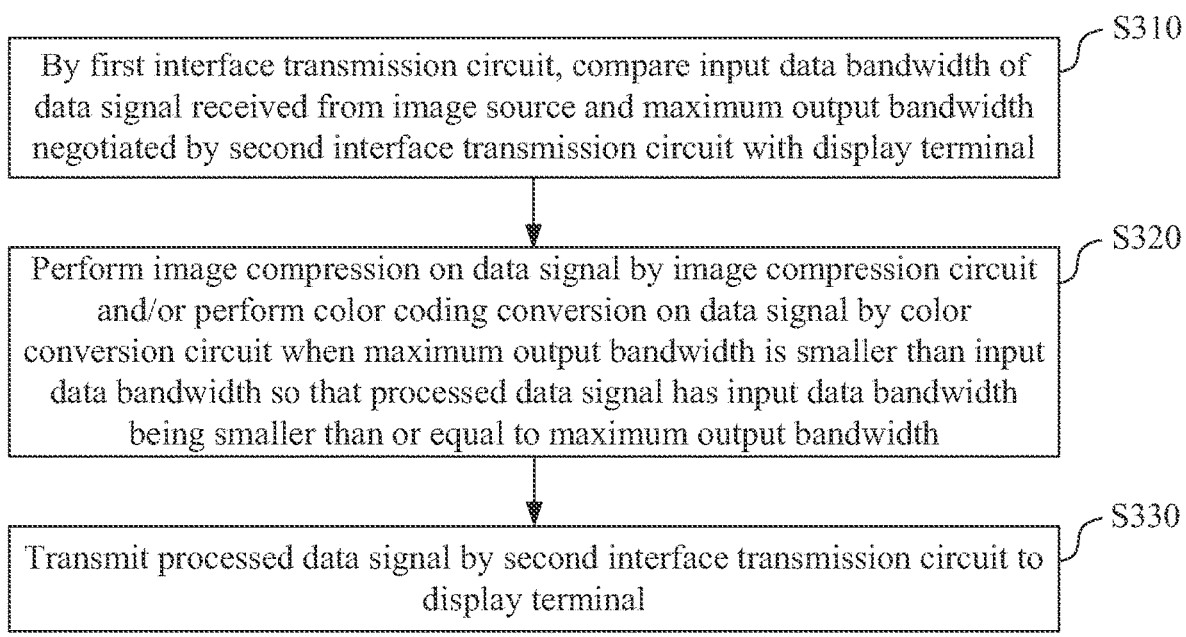
FIG. 3 illustrates a flow chart of a video interface conversion method according to an embodiment of the present invention.

Reference is now made to FIG. 3. FIG. 3 is a flow chart of a video interface conversion method 300 according to an embodiment of the present invention.

Besides the device described above, the present invention further provides the video interface conversion method 300 that can be used in such as, but not limited to the video interface conversion device 100 in FIG. 1. As illustrated in FIG. 3, an embodiment of the video interface conversion method 300 includes the following steps.

In step S310, by the first interface transmission circuit 110, the input data bandwidth of the data signal DS received from the image source VS and the maximum output bandwidth negotiated by the second interface transmission circuit 120 with the display terminal DT are compared.

In step S320, image compression is performed by the image compression circuit 150 and/or color coding conversion is performed by the color conversion circuit 140 on the data signal DS when the maximum output bandwidth is smaller than the input data bandwidth so that the data signal DS after processing (data signal DS') has the input data bandwidth being smaller than or equal to the maximum output bandwidth.

In step S330, the data signal DS after processing (data signal DS') is transmitted by the second interface transmission circuit 120 to the display terminal DT.

It is appreciated that the embodiments described above are merely an example. In other embodiments, it should be appreciated that many modifications and changes may be made by those of ordinary skill in the art without departing, from the spirit of the invention.

In summary, the video interface conversion device and the video interface conversion method can perform coordination when the input data bandwidth of the data signal received from the image source by the first interface transmission circuit is different from the maximum output bandwidth negotiated by the second interface transmission circuit with the display terminal to accomplish the most efficient data transmission and the best display result.

The aforementioned descriptions represent merely the preferred embodiments of the present disclosure, without any intention to limit the scope of the present disclosure thereto. Various equivalent changes, alterations, or modifications based on the claims of present disclosure are all consequently viewed as being embraced by the scope of the present disclosure.

What is claimed is:

1. A device, comprising:
a first interface transmission circuit electrically coupled to an image source;
a second interface transmission circuit electrically coupled to a display terminal to negotiate a maximum output bandwidth with the display terminal such that the first interface transmission circuit compares an input data bandwidth of a data signal received from the image source and the maximum output bandwidth;
an image decompression circuit configured to perform image decompression on the data signal when the first interface transmission circuit determines that the data signal is not a standard image format
a color conversion circuit; and
an image compression circuit;
wherein when the maximum output bandwidth is smaller than the input data bandwidth, the image compression circuit is configured to perform image compression on the data signal and/or the color conversion circuit is configured to perform color coding conversion on the data signal so that the processed data signal has the input data bandwidth being smaller than or equal to the maximum output bandwidth, and wherein the processed data signal is further transmitted by the first interface transmission circuit to the display terminal.

2. The device of claim 1, wherein the first interface transmission circuit is configured to substantially compare the input data bandwidth of the data signal that is decompressed with the maximum output bandwidth.

3. The device of claim 1, wherein the second interface transmission circuit directly outputs the decompressed data signal when the maximum output bandwidth is larger than the input data bandwidth of the decompressed data signal.

4. The device of claim 1, wherein when the maximum output bandwidth is larger than the input data bandwidth, the second interface transmission circuit reconnects to the display terminal and negotiates an output bandwidth that is larger than or equal to the input data bandwidth and is closest to the input data bandwidth.

5. The device of claim 1, wherein the second interface transmission circuit is further configured to determine a wire transmission ability between the second interface transmission circuit and the display terminal to determine the maximum output bandwidth according to a plurality of output bandwidths supported by the display terminal and the wire transmission ability.

6. The device of claim 5, wherein the second interface transmission circuit amends a supported output bandwidth of display terminal identification information according to the wire transmission ability and transmits the supported output bandwidth to the image source through the first interface transmission circuit such that the image source amends the input data bandwidth of the data signal according to the supported output bandwidth and retransmits the data signal.

7. The device of claim 1, wherein the color coding conversion that the color conversion circuit performs on the data signal comprises a color format conversion, a color depth coding or a combination thereof.

8. The device of claim 1, wherein the first interface transmission circuit corresponds to a first image interface format, the second interface transmission circuit corresponds to a second image interface format different from the first image interface format, and the second interface transmission circuit is further configured to convert the data signal from the first image interface format to the second image interface format.

9. A method comprising:
by a first interface transmission circuit, comparing an input data bandwidth of a data signal received from an image source and a maximum output bandwidth negotiated by a second interface transmission circuit with a display terminal;
performing image decompression on the data signal by an image decompression circuit when the first interface transmission circuit determines that the data signal is not a standard image format;
performing image compression on the data signal by an image compression circuit and/or performing color coding conversion on the data signal by a color conversion circuit when the maximum output bandwidth is smaller than the input data bandwidth so that the processed data signal has the input data bandwidth being smaller than or equal to the maximum output bandwidth; and
transmitting the processed data signal by the second interface transmission circuit to the display terminal.

10. The method of claim 9, further comprising:
substantially comparing the input data bandwidth of the data signal that is decompressed with the maximum output bandwidth by the first interface transmission circuit.

11. The method of claim 9, further comprising:
directly outputting the decompressed data signal by the second interface transmission circuit when the maximum output bandwidth is larger than the input data bandwidth of the decompressed data signal.

12. The method of claim 9, further comprising:
reconnecting to the display terminal and negotiating an output bandwidth that is larger than or equal to the input data bandwidth and is closest to the input data bandwidth by the second interface transmission circuit when the maximum output bandwidth is larger than the input data bandwidth.

13. The method of claim 9, further comprising:
- determining a wire transmission ability between the second interface transmission circuit and the display terminal by the second interface transmission circuit; and
- determining the maximum output bandwidth by the second interface transmission circuit according to a plurality of output bandwidths supported by the display terminal and the wire transmission ability.

14. The method of claim 13, further comprising:
- amending a supported output bandwidth of display terminal identification information by the second interface transmission circuit according to the wire transmission ability;
- transmitting the supported output bandwidth by the second interface transmission circuit to the image source through the first interface transmission circuit such that the image source amends the input data bandwidth of the data signal according to the supported output bandwidth and retransmits the data signal.

15. The method of claim 9, wherein the color coding conversion that the color conversion circuit performs on the data signal comprises a color format conversion, a color depth coding or a combination thereof.

16. The method of claim 9, wherein the first interface transmission circuit corresponds to a first image interface format, the second interface transmission circuit corresponds to a second image interface format different from the first image interface format, the method further comprises:
- converting the data signal from the first image interface format to the second image interface format by the second interface transmission circuit.

* * * * *